(12) United States Patent
Mingyan (10) Patent No.: US 10,871,002 B1
(45) Date of Patent: *Dec. 22, 2020

(54) BICYCLE PARKING DEVICE (71) Applicant: Hangzhou Canyu Technology Co., Ltd, Zhejiang (CN)

(72) Inventor: Zhao Mingyan, Zhejiang (CN)

(73) Assignee: Hangzhou Canyu Technology Co., Ltd, Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/013,730

(22) Filed: Sep. 7, 2020

Related U.S. Application Data (63) Continuation-in-part of application No. 16/593,878, filed on Oct. 4, 2019, now Pat. No. 10,801,227.

(30) Foreign Application Priority Data

Oct. 10, 2018 (CN) .......................... 2018 1 1177218

(51) Int. Cl.
*E04H 6/28* (2006.01)
*B62H 3/08* (2006.01)
*E04H 6/00* (2006.01)
*E04H 1/12* (2006.01)

(52) U.S. Cl.
CPC ................. *E04H 6/28* (2013.01); *B62H 3/08* (2013.01); *E04H 6/005* (2013.01); *E04H 1/1205* (2013.01)

(58) Field of Classification Search
CPC .............. E04H 6/28; E04H 6/005; B62H 3/08
See application file for complete search history.

(56) References Cited

U.S. PATENT DOCUMENTS

| 2017/0282868 | A1* | 10/2017 | Mondro | ................. B60S 13/02 |
| 2020/0080333 | A1* | 3/2020 | Zahn | ....................... E04H 6/005 |
| 2020/0141147 | A1* | 5/2020 | Mingyan | .................. E04H 6/28 |

FOREIGN PATENT DOCUMENTS

| CN | 106437251 | * | 2/2017 |
| DE | 202014105780 | * | 5/2015 |
| KR | 2016003138 | * | 9/2016 |

* cited by examiner

*Primary Examiner* — Kimberley S Wright
(74) *Attorney, Agent, or Firm* — Kunzler Bean & Adamson (57) ABSTRACT

For parking a bicycle, a bicycle parking device includes a lower braced frame, a rotating platform, at least one rotating column structure, and a lifting device. The lower supporting frame that installs a rotating platform and supports an upper supporting frame through a bracing rod. The rotating platform is arranged on the lower braced frame and a fan-shaped notch is arranged on the rotating platform. The at least one rotating column structure that supports the lower braced frame, wherein at least one rotating column structure supports the lower braced frame. The lifting device arranged in the rotating column structure is detachably connected to a carrier frame used for carrying bicycles.

14 Claims, 5 Drawing Sheets

BICYCLE PARKING DEVICE

CROSS-REFERENCE TO RELATED APPLICATIONS

This patent application is a continuation-in-part application that claims priority to U.S. patent application Ser. No. 16/593,878 entitled "BICYCLE PARKING DEVICE" filed on Oct. 4, 2019 for Zhao Mingyan, the entire contents of which are incorporated herein by reference for all purposes, which claims priority to Chinese Patent Application No. CN2018111772189 filed on Oct. 10, 2018 for Zhao Mingyan, the entire contents of which are incorporated herein by reference for all purposes.

BACKGROUND

Field

The subject matter disclosed herein relates to public bicycle parking facilities and more particularly to bicycle parking devices.

Description of the Related Art

Parking a bicycle requires a significant footprint.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

China is the largest bicycle country in the world, with more than 450 million bicycles. Coupled with the increasing number of shared bicycles, the phenomenon of random parking is becoming more and more serious, which leads to local governments restricting the further release of shared bicycles. In the past, bicycles are parked mainly on the ground and in designated areas. The problem of difficult parking and random parking of bicycles has become a problem of urban development. On the one hand, green travel is advocated, while on the other hand, proper parking space cannot be created for bicycles. One of the most important reasons is that space location has not been used effectively. If space location can be used effectively, bicycle parking problems can be alleviated. However, the existing technology does not provide enough space for bicycles.

In view of this, the purpose of the invention is to provide an bicycle parking device to realize bicycle parking space, so as to alleviate the problem of bicycle parking difficulty.

The technical solution of the invention is to provide a bicycle parking device with the following structures, including:

The upper bracket, located on the upper part of the bicycle parking device, is used to install the rotating platform;

The gazebo cover fitted to the upper bracket;

Rotating platform that is arranged on the upper bracket and a fan-shaped notch is arranged on it;

The rotating column structure that is used to support the upper bracket, wherein at least one rotating column structure supports the rotating platform;

A lifting device is arranged in the rotating column structure; and a lifting device is installed in the lifting channel. The lifting device is detachably connected to the carrier frame used for carrying bicycles.

As an improvement, when the bike is stored, the rotary platform rotates a vacant carrier frame to its junction with the lifting device, which is connected with the vacant carrier frame. The second set of plates rotates and overlaps with the second set of plates to leave the vertical open door, and the empty carrier frame faces the vertical open door. The lifting device drives the vacant carrier frame downward. When descending the journey to the end, the bicycle to be parked is stored on the vacant carrier frame. The front and rear wheels of the bicycle to be parked are embedded in the front and rear wheel positioning slots respectively. The rotary platform rotates the gap on it to the lifting channel, and the lifting device drives the carrier frame containing the parked bicycle to the top of the rotating platform. The rotating platform rotates, and the empty parking area is rotated to the lifting passage. The lifting device descends to the rotating platform, disconnects the connection between the lifting device and the carrier frame, and the carrier frame is placed on the rotating platform.

As an improvement, when the bicycle is taken for use, the rotating platform rotates, and the carrier frame carrying the corresponding bicycle is rotated to the junction with the lifting device. The second set of plates rotates and superposes with the first set of plates to leave the vertical open door, and the carrier frame with the corresponding bicycle faces the vertical open door. The lifting device drives the carrier frame carrying the corresponding bicycle down, and when descending to the end of the journey, the bicycle is removed from the carrier frame carrying the corresponding bicycle, and the vacant carrier frame is moved to the rotating platform.

As an improvement, the rotating column structure includes the first set of plates and the second set of plates enclosed, wherein the first set of plates is fixed and installed, and the second set of plates can be rotated and installed; In the working state, the second set of plates rotates and overlaps with the second set of plates, so that the rotating column structure forms a vertical opening for the lifting of the carrier frame; In the non-working state, the second set of plates rotates and dislocates with the first set of plates, so that the first set of plates and the second set of plates surround the synthetic cylinder.

As an improvement, the lifting device includes lifting screw rod, lifting guide rail and lifting nut. The lifting guide rail is vertically arranged in the lifting channel, and the lifting nut can be glibly connected to the lifting guide rail, and the lifting screw rod is screwed into the lifting nut. The lifting screw rod rotates to drive the lifting nut to move up and down along the lifting guide rail; The carrier frame is detachably connected with the lifting nut.

As an improvement, the lifting nut is connected with an electromagnet fixing plate, and the electromagnet fixing plate is connected with an electromagnet, and the carrier frame is provided with a magnetic or iron backplate. The connection and release of the electromagnet with the back plate of the carrier frame are realized by power-on and power-off of the electromagnet.

As an improvement, the outer part of the second set of plates is provided with an arc gear ring, which meshes with the first driving wheel. The first gear is driven by the first motor to drive the arc gear ring to drive the second set of plates to rotate.

As an improvement, the rotary platform is provided with a second motor, a second driving wheel and a platform center wheel. The second motor is connected with the second driving wheel, and the second driving wheel engages with the platform center wheel.

As an improvement, the carrier frame includes a bottom plate and a back plate, and the front wheel positioning groove and the rear wheel positioning groove are arranged on the bottom plate, and reinforcing plates are arranged on both sides of the connection between the bottom plate and the back plate.

As an improvement, the rotary platform is provided with a plurality of locating pins, and the bottom plate of the carrier frame is provided with locating pin holes for inserting the locating pins.

Compared with the prior art, the structure of the invention has the following advantages: Through the invention, the gazebo is transformed, and the platform on the gazebo is used as the platform for parking bicycles. The gazebo's column is converted into a lifting channel, so that the lifting of bicycles can be completed through automatic machinery, which reduces the occupation of ground space, improves the utilization rate of space, and alleviates the problem of difficult parking of bicycles in cities.

The following is a detailed description of the preferred embodiments of the utility model in conjunction with the drawings, but the utility model is not limited to these embodiments. The utility model covers any substitution, modification, equivalent method and scheme in the spirit and scope of the utility model.

In order to make the public have a thorough understanding of the utility model, the specific details are detailed in the following preferred embodiment of the utility model, and the technical personnel in the field can fully understand the utility model without the description of these details.

In the following paragraphs, the utility model is described in more detail by way of examples with reference to the drawings. It should be noted that the appended drawings are in simpler form and use inaccurate proportions, which are only used to conveniently and clearly assist in explaining the purpose of the embodiment of the utility model.

The invention can be modified based on the existing parking gazebo, and can also be set in the sidewalk, roadside, residential area, scenic area, bridge and so on. The bicycle parking lot is implanted into the gazebo, which gives the gazebo parking function without changing the overall structure. The built-in lifting device is added to make the pillar become the main component of the conveying bicycle without changing the shape and function of the pillar. It is set over bridges and roads without affecting the traffic of vehicles and pedestrians, and can beautify the environment.

Figure 1:
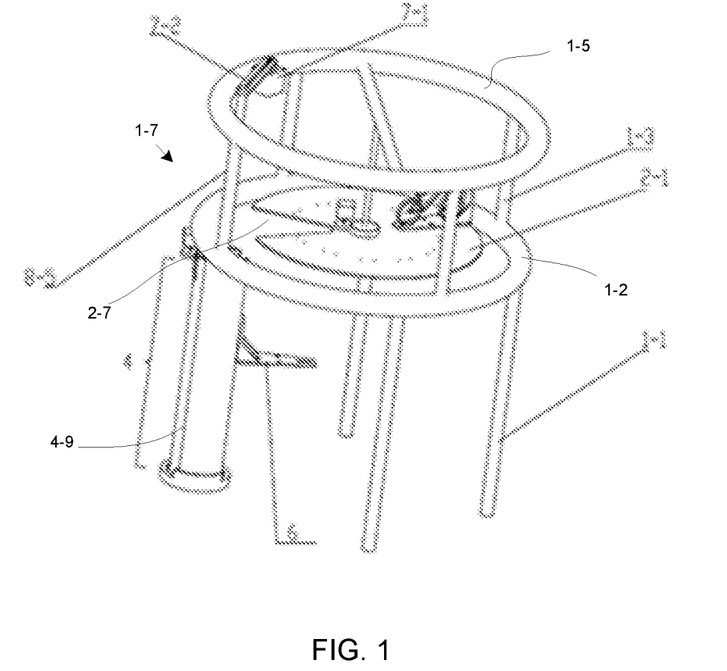
FIG. 1 is a schematic diagram of the overall structure of the bicycle parking device of the invention.

As shown in FIG. 1, the principle structure of the bicycle parking device 1-7 of the present embodiment is illustrated. The bicycle parking device 1-7 includes:

The lower braced frame 1-2, located on the bicycle parking device 1-7, installs a rotating platform. 2-1, The rotating platform 2-1 can be rotatably arranged on the lower braced frame 1-2, and a fan-shaped notch 2-7 is placed in the rotating platform 2-1.

The supporting columns 1-1 support the lower braced bracket 1-2. And, at least one rotating column structure 4, which carries the rotating platform 2-1, and the lifting channel 4-9 is provided within the rotating column structure 4, and a lifting device is installed in the lifting channel 4-9, which is detachably connected to the carrier frame used for carrying bicycles. In this embodiment, a rotating column structure 4 is provided as an example. The supporting column 1-1 and rotating column structure 4 may be gazebo columns. The supporting column 1-1 is an ordinary gazebo column, and the rotating column structure 4 is a gazebo column with the lifting channel 4-9 after modification. The support columns 1-3 support an upper supporting frame 1-5 and may include a lifting screw 8-5.

Figure 2:
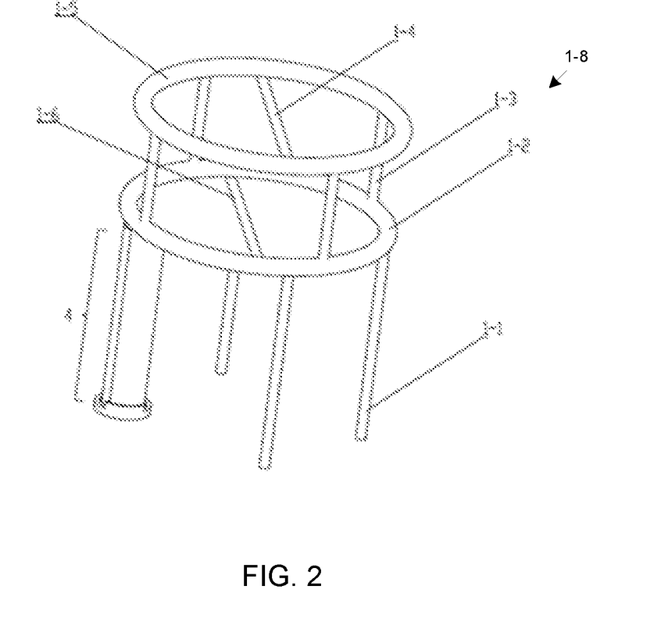
FIG. 2 is a partial frame diagram of the invention.

The frame structure of the bicycle parking device 1-7 is shown in FIG. 2. Supporting column 1-1 is used to support an upper support 1-8, which includes upper supporting beam 1-4, upper supporting frame 1-5, support columns 1-3, lower braced frame 1-2 and lower supporting beam 1-6; The two ends of the fixed rod 2-4 are respectively fixed on upper support beam 1-4 and lower support beam 1-6. The lower support beam 1-6 supports the rotating platform 2-1 through thrust bearing, so that the rotating platform 2-1 can rotate independently on the horizontal plane. A gazebo cover can be added on the upper supporting frame 1-5 to become a gazebo. The gazebo cover can be designed arbitrarily, such as adding solar panels, charging functions and billboards.

Figure 3:
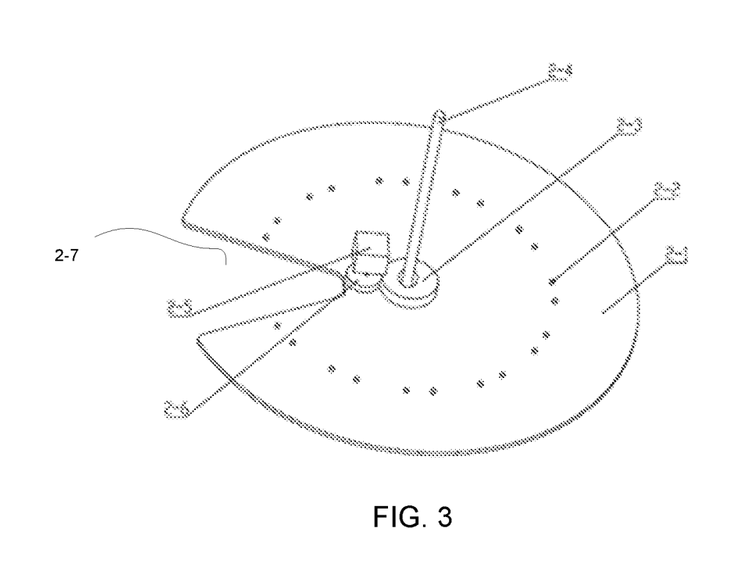
FIG. 3 is a schematic diagram of the rotating platform.

As shown in FIG. 3, the structure of the rotating platform 2-1 is indicated. A second motor 2-5, a second driving wheel 2-6 and a platform center wheel 2-3 are arranged on the rotating platform 2-1. The second motor 2-5 is connected with the second driving wheel 2-6, and the second driving wheel 2-6 engages with the platform center wheel 2-3. The second motor 2-5 is fixed on the upper supporting frame 1-5, and the second motor 2-5 drives the second driving wheel 2-6, so as to drive the center wheel 2-3 of the platform 2-3 and the rotating platform 2-1 to rotate together (the platform center wheel 2-3 and the rotating platform 2-1 are fixed as one). The positioning pin 2-2 is distributed on the rotating platform 2-1, and the positioning pin 2-2 is positioned on the carrier frame 6 (the carrier frame 6 has corresponding positioning pin holes).

Figure 4:
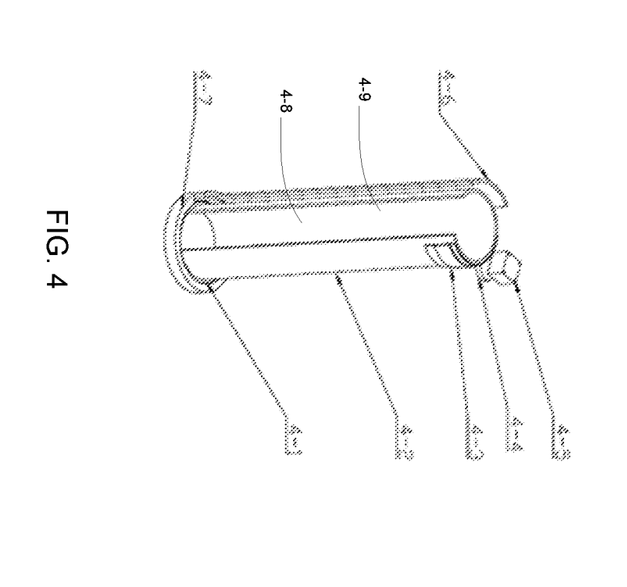
FIG. 4 is a schematic diagram of the rotating column structure.
Figure 5:
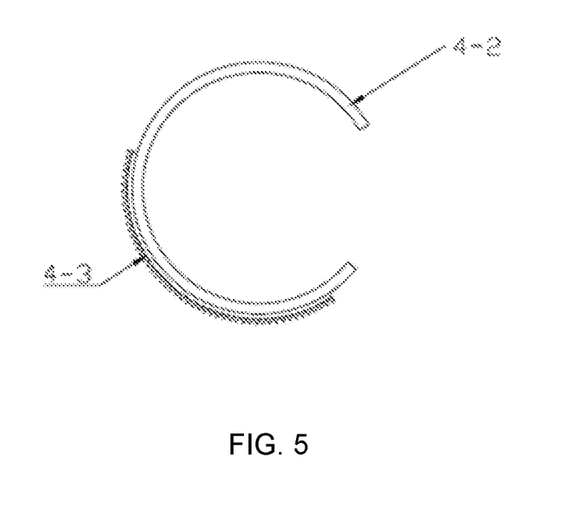
FIG. 5 is the structural diagram of the matching of arc-shaped gear ring and the second set of plates.

As shown in FIG. 4, the rotating column structure 4 is shown. The first motor 4-5 drives the first drive wheel 4-4, and the first drive wheel 4-4 meshes with the arc gear ring 4-3. When the first drive wheel 4-4 rotates, the drive arc ring 4-3 drives the second set 4-2 to rotate together (the arc ring 4-3 and the second set 4-2 are fixed together, and the curvature radius of the arc ring 4-3 is the same as the curvature radius of the second set of plates 4-2, as shown in FIG. 5, so that the upper part of the second set of plates 4-2 has meshing teeth. And the meshing teeth on the arc ring 4-3 are located on the outer side. In the non-working state, the rotation of the second set of plates 4-2 makes the vertical opening on the second set of plates 4-2 overlap with the first set of plates 4-6, and the first set of plates 4-6 covers the vertical opening on the second set of plates 4-2 to play a role of safety protection.

The radius of curvature of the first set of plates 4-6 is slightly larger than that of the second set of plates 4-2, and the gap is not exposed when the second set of plates 4-2 are enclosed, which is safer. The width (arc length) of the first set of plates 4-6 is slightly larger than that of the second set of plates 4-2 (arc length). The first set of plates 4-6 and the second set of plates 4-2 are mounted on the thrust bearing 4-1 and rotate mutually on the thrust bearing 4-1.

Figure 6:
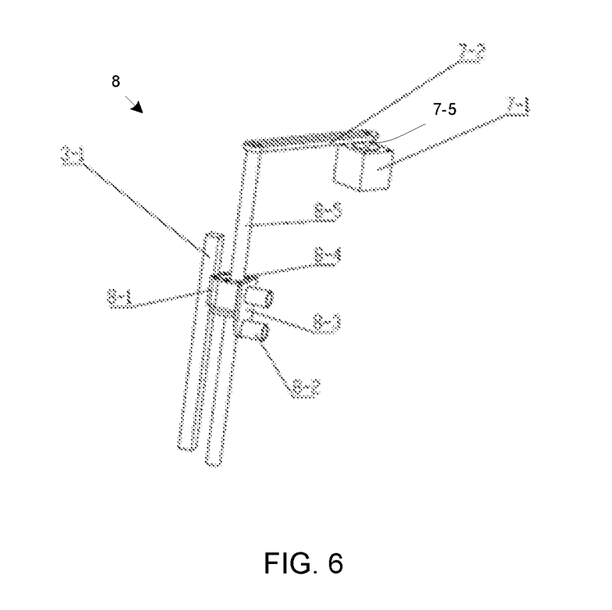
FIG. 6 is the structural diagram of the lifting device.

As shown in attached FIG. 6, the specific structure of the lifting device 8. The lifting device 8 includes the lifting screw 8-5, the lifting guide rail 3-1 and the lifting nut 8-4, shown with the lifting guide rail 3-1 which is vertically set in the lifting channel 4-9. The lifting nut 8-4 can slide connection on the lifting guide rail 3-1. The lifting screw 8-5 spins the lifting nut 8-4. The lifting screw 8-5 rotation drives the lifting nut 8-4 to move up and down along the lifting guide rail 3-1. The carrier frame 6 is detachably connected with the lifting nut 8-4. The lifting device 8 is hidden inside the rotating column structure 4. When working, the lifting motor 7-1 and a tensioning wheel 7-5 drive the lifting belt 7-2 to make the lifting screw 8-5 rotate. During the lifting nut 8-4 action, the lifting nut 8-4 is connected with the electromagnet 8-2. When the electromagnet 8-2 is energized and magnetic, the electromagnet 8-2 engages the carrier frame 6, so that the carrier frame 6 may be lifted. The bicycle 5 may be on the carrier frame 6. The vertical opening width of the second set of plates 4-2 is slightly larger than the size of the electromagnet 8-2.

Figure 7:
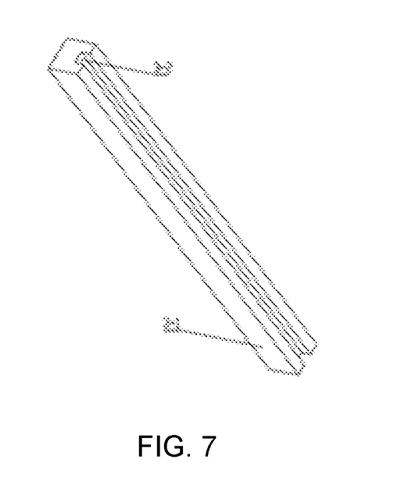
FIG. 7 is the structural diagram of the lifting guide rail.

The structure of the lifting guide 3-1 is shown in FIG. 7. The lifting guide 3-1 is equipped with the positioning slot 3-2 of the lifting guide 3-1.

Figure 8:
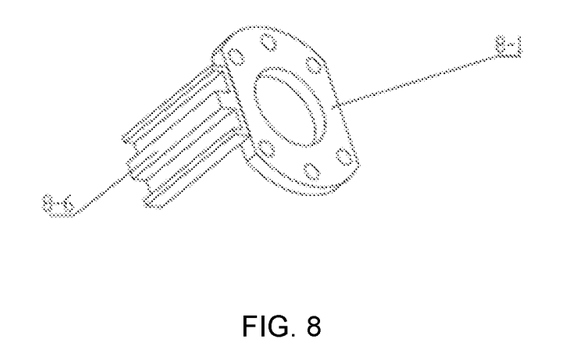
FIG. 8 is the structural diagram of the lifting nut connecting plate.

As shown in FIG. 8, the structure of the lifting nut connecting plate 8-1 is illustrated. Because the lifting nut connecting plate 8-1 is specially designed with the lifting guide rail positioning groove 3-2 on the lifting guide rail 3-1, the lifting nut 8-4 can be lifted smoothly.

Figure 9:
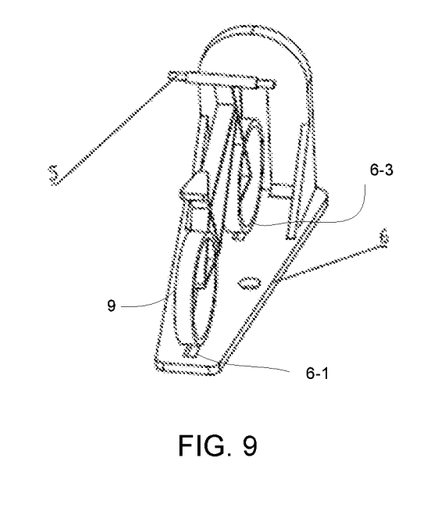
FIG. 9 is a schematic diagram of the bicycle parked on the carrier frame.

As shown in FIG. 9, the status of the bicycle 5 parked on the carrier frame 6 is indicated. The bottom plate of the carrier frame 6 is provided with a front wheel positioning groove 6-3 and a rear wheel positioning groove 6-1, and two wheels 9 of the bicycle 5 are embedded in the front wheel positioning groove 6-3 and the rear wheel positioning groove 6-1 respectively.

Figure 10:
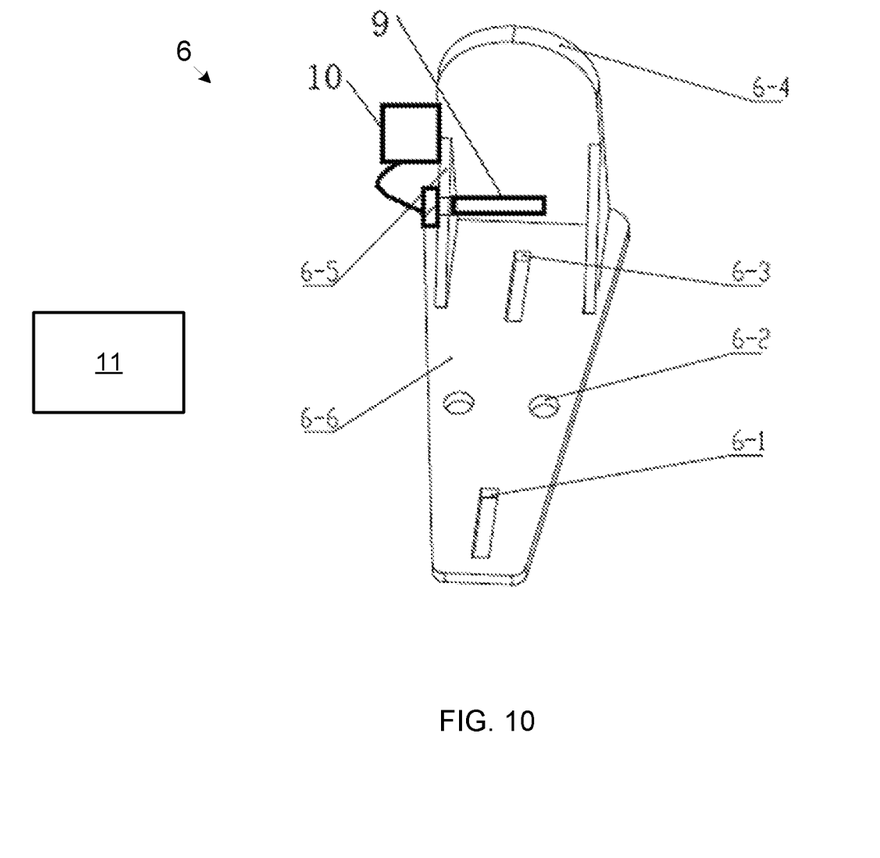
FIG. 10 is a schematic diagram of the carrier frame.

As shown in FIG. 10, a carrier frame 6 comprises a bottom plate 6-6 and a back plate 6-4, and a reinforcing plate 6-5 is arranged on both sides of the connection between the bottom plate 6-6 and the back plate 6-4. The front wheel positioning groove 6-3 and a rear wheel positioning groove 6-1 are arranged on the bottom plate 6-6 of the carrier frame 6. A plurality of positioning pins are arranged on the rotating platform 2-1, and the bottom plate 6-6 of the carrier frame is provided with a positioning pin hole 6-2 for insertion of the positioning pin.

An electric control lock 9 for locking the bicycle is disposed on the carrier frame 6. The electronic control lock 9 may include an actuator that secures the bicycle to the carrier frame 6 when the electronic control lock 9 is locked and allows the bicycle to be removed when the electronic control lock 9 is unlocked. The electric control lock 9 is connected to a controller 10. The controller 10 detects the locked or unlocked state of the electric control lock 9. The controller 10 comprises a wireless transmission module, which transmits the state of the electric control lock 9 to an electronic device 11 such as a PC or mobile phone. The controller 10 may further receive a lock command to lock the electronic control lock 9 from the electronic device 11. The controller 10 may further receive an unlock command to unlock the electronic control lock 9 from the electronic device 11. The controller 10 may direct the electronic control lock 9 to lock or unlock in response to the command. In one embodiment, the controller 10 bills the user for parking through the electronic device 11. In addition, the controller 10 may manage parking times with the electronic device 11.

The lifting device 8 is driven by the lifting motor 7-1, which drives the tensioning wheel 7-5 to rotate. The lifting belt 7-2 is set on the tensioning wheel 7-5. The lifting belt 7-2 drives the lifting screw 8-5 to rotate, so that the lifting nut 8-4 can be lifted, and the electromagnet 8-2 on the lifting nut 8-4 can adsorb and loosen the carrier frame 6, so that the carrier frame 6 can be lifted, and the rotating platform 2-1 can cooperate with the carrier frame 6.

The shape of carrier frame 6 is the same as the notch shape of rotating platform 2-1, so carrier frame 6 can pass through the notch of rotation platform 2-1. When the carrier frame 6 is higher than the rotating platform 2-1, so that an empty car position on the rotating platform 2-1 reaches directly below the carrier frame 6, the electromagnet power is cut off, and the carrier frame 6 drops to the rotating platform 2-1.

Multiple racks 6 (bikes may or may not be parked on racks 6) are placed on the rotating platform 2-1. Detailed action breakdown is as follows:

If one needs to take the rack 6 from the rotating platform 2-1, complete the following actions: The first motor works 4-5 to rotate the vertical open door 4-8 of the second set of plates 4-2 to the working (open) position. The lifting motor 7-1 motivates the lifting nut 8-4 rise to the set position. The rotating platform 2-1 is rotated so that the carrier frame 6 for the bicycle 5 to be collected is rotated to the gap facing the second set of plates 4-2; The electromagnet 8-2 will be electrified and the carrier frame 6 will be engaged. The lifting nut 8-4 will engage the carrier frame 6 and then continue to raise the set height (about the height of a bicycle, higher than all carrier frames 6 and the highest bicycle height on the rotating platform 2-1). The rotating platform 2-1 rotates and makes the gap on rotating platform 2-1 reach directly below the vehicle 6 to be taken. At this time, the lifting motor 7-1 motivates the lifting nut 8-4, so that the carrier frame 6 is dropped down to the ground, completing the pick-up action. The second set of plates 4-2 may be rotated to open the rotating column structure 4.

The action mentioned above is reversed when storing bicycles 5. The empty frame 6 is motivated to the ground. The person places the bicycle 5 on the frame 6, then the frame 6 rises to the set position, and the rotating platform 2-1 rotates, so that the empty space on the rotating platform 2-1 is positioned below the frame 6, and the frame 6 is lowered to the rotating platform 2-1. The electromagnet 8-2 is powered off and the storage operation is completed.

When the bicycle 5 is not accessed, the carrier frame 6 can also rise to the level of the fan-shaped notch 2-7 with the rotating platform 2-1. Looking up from the bottom of the bicycle parking device 1-7, the carrier frame 6 and the rotating platform 2-1 are closed to form a complete disc. The shape of carrier frame 6 coincides with the fan-shaped notch 2-7 of rotating platform 2-1. There is a gap between rotating platform 2-1 and lower support frame 1-2, which does not affect the normal lift of electromagnet 8-2.

The driving motors are stepper motors, and the position can be precisely controlled. At the same time, various position sensors are added to ensure accurate transmission time and position control. For beauty's sake, the multiple columns 4/1-1 of the gazebo may be designed to look the same. A touch screen and/or LCD advertising may be disposed on the columns 4/1-1.

Each motor and driving mechanism of the invention is controlled by a controller, and corresponding sensors are set for detecting position, stroke and other information.

Although the embodiments are described and elaborated separately above, some common technologies are involved, and it seems to ordinary technicians in the field that they can be replaced and integrated between embodiments, referring to another embodiments that are not explicitly documented in one of the embodiments.

The better embodiments of the present invention are described above, but cannot be understood as restrictions on claims. The invention is not limited to the above embodiments, and its specific structure allows for changes. In short, all changes made within the scope of the protection of the independent claims of the invention are within the scope of the protection of the invention.

What is claimed is:

1. A bicycle parking device comprising:
   a lower braced frame that installs a rotating platform and supports an upper supporting frame through a bracing rod;
   a rotating platform arranged on the lower braced frame and a fan-shaped notch is arranged on the rotating platform;
   at least one rotating column structure that supports the lower braced frame, wherein at least one rotating column structure supports the lower braced frame and comprises a first set of plates and a second set of plates enclosed by the first set of plates, wherein the first set of plates is fixed to a base, and the second set of plates can be rotated within the base, wherein in a working state, the second set of plates rotates and overlaps with the first set of plates, so that the rotating column structure forms a vertical opening for the lifting device that lifts a carrier frame, and wherein in the non-working state, the second set of plates rotates and dislocates with the first set of plates, so that the first set of plates and the second set of plates to form a synthetic cylinder;
   a lifting device arranged in the rotating column structure is detachably connected to the carrier frame used for carrying bicycles, wherein the lifting device includes a lifting screw rod, a lifting guide rail and a lifting nut, the lifting guide rail is vertically arranged in the lifting channel, and the lifting nut can be glideably connected to the lifting guide rail, and the lifting screw rod is screwed into the lifting nut, the lifting screw rod rotates to drive the lifting nut to move up and down along the lifting guide rail, the carrier frame is detachably connected with the lifting nut, and the lifting nut is connected with an electromagnet fixing plate, and the electromagnet fixing plate is connected with an electromagnet, and the carrier frame is provided with a magnetic or iron backplate, the connection and release of the electromagnet with the back plate of the carrier frame are realized by power-on and power-off of the electromagnet;
   wherein when the bicycle is stored, the rotating platform rotates a vacant carrier frame to a carrier frame junction with the lifting device, which is connected with the vacant carrier frame, the second set of plates rotates and overlaps with the first set of plates to leave a vertical open door, and the empty carrier frame faces the vertical open door, the lifting device drives the vacant carrier frame downward, wherein at the bottom of the rotating column structure, the bicycle is parked on the vacant carrier frame, the front and rear wheels of the bicycle parked are disposed in the front wheel positioning slot and rear wheel positioning slot, wherein subsequently the rotating platform rotates the gap on it to the lifting channel, and the lifting device drives the carrier frame containing the parked bicycle to the top of the rotating platform, the rotating platform rotates, and the empty parking area is rotated to the lifting passage, the lifting device descends to the rotating platform, disconnects the connection between the lifting device and the carrier frame, and the carrier frame is placed on the rotating platform; and
   wherein when the bicycle is taken for use, the rotating platform rotates, and the carrier frame carrying the corresponding bicycle is rotated to the junction with the lifting device, the second set of plates rotates and superposes with the first set of plates to leave the vertical open door, and the carrier frame with the corresponding bicycle faces the vertical open door, the lifting device drives the carrier frame carrying the corresponding bicycle down, and when descending to the end of the journey, the bicycle is removed from the carrier frame carrying the corresponding bicycle, and the vacant carrier frame is moved to the rotating platform.

2. The bicycle parking device of claim 1, the carrier frame further comprising an electronic control lock that locks the bicycle to the carrier frame in response to a lock command from an electronic device and unlocks the bicycle from the carrier frame in response to an unlock command from the electronic device.

3. The bicycle parking device of claim 1, the bicycle parking device further comprising a controller that bills the user for parking through an electronic device.

4. The bicycle parking device of claim 1, wherein the outer part of the second set of plates is provided with an arc gear ring which meshes with the first driving wheel, the first gear is driven by the first motor to drive the arc gear ring to drive the second set of plates to rotate.

5. The bicycle parking device of claim 4, wherein the rotating platform is provided with a second motor, a second driving wheel and a platform center wheel, the second motor is connected with the second driving wheel, and the second driving wheel engages with the platform center wheel.

6. The bicycle parking device of claim 5, wherein the carrier frame includes a bottom plate and a back plate, and the front wheel positioning groove and the rear wheel positioning groove are arranged on the bottom plate, and reinforcing plates are arranged on both sides of the connection between the bottom plate and the back plate.

7. The bicycle parking device of claim 6, wherein the rotating platform is provided with a plurality of locating pins, and the bottom plate of the carrier frame is provided with locating pin holes for inserting the locating pins.

8. A bicycle parking system comprising:
   an upper supporting frame;
   a lower braced frame that installs a rotating platform and supports the upper supporting frame through a bracing rod;
   a rotating platform arranged on the lower braced frame and a fan-shaped notch is arranged on the rotating platform;
   at least one rotating column structure that supports the lower braced frame, wherein at least one rotating column structure supports the lower braced frame and comprises a first set of plates and a second set of plates enclosed by the first set of plates, wherein the first set of plates is fixed to a base, and the second set of plates can be rotated within the base, wherein in a working state, the second set of plates rotates and overlaps with the first set of plates, so that the rotating column structure forms a vertical opening for the lifting device that lifts a carrier frame, and wherein in the non-working state, the second set of plates rotates and dislocates with the first set of plates, so that the first set of plates and the second set of plates to form a synthetic cylinder;

a carrier frame used for carrying bicycles; and a lifting device arranged in the rotating column structure is detachably connected to the carrier frame, wherein the lifting device includes a lifting screw rod, a lifting guide rail and a lifting nut, the lifting guide rail is vertically arranged in the lifting channel, and the lifting nut can be glideably connected to the lifting guide rail, and the lifting screw rod is screwed into the lifting nut, the lifting screw rod rotates to drive the lifting nut to move up and down along the lifting guide rail, the carrier frame is detachably connected with the lifting nut, and the lifting nut is connected with an electromagnet fixing plate, and the electromagnet fixing plate is connected with an electromagnet, and the carrier frame is provided with a magnetic or iron backplate, the connection and release of the electromagnet with the back plate of the carrier frame are realized by power-on and power-off of the electromagnet;

wherein when the bicycle is stored, the rotating platform rotates a vacant carrier frame to a carrier frame junction with the lifting device, which is connected with the vacant carrier frame, the second set of plates rotates and overlaps with the first set of plates to leave a vertical open door, and the empty carrier frame faces the vertical open door, the lifting device drives the vacant carrier frame downward, wherein at the bottom of the rotating column structure, the bicycle is parked on the vacant carrier frame, the front and rear wheels of the bicycle parked are disposed in the front wheel positioning slot and rear wheel positioning slot, wherein subsequently the rotating platform rotates the gap on it to the lifting channel, and the lifting device drives the carrier frame containing the parked bicycle to the top of the rotating platform, the rotating platform rotates, and the empty parking area is rotated to the lifting passage, the lifting device descends to the rotating platform, disconnects the connection between the lifting device and the carrier frame, and the carrier frame is placed on the rotating platform; and wherein when the bicycle is taken for use, the rotating platform rotates, and the carrier frame carrying the corresponding bicycle is rotated to the junction with the lifting device, the second set of plates rotates and superposes with the first set of plates to leave the vertical open door, and the carrier frame with the corresponding bicycle faces the vertical open door, the lifting device drives the carrier frame carrying the corresponding bicycle down, and when descending to the end of the journey, the bicycle is removed from the carrier frame carrying the corresponding bicycle, and the vacant carrier frame is moved to the rotating platform.

9. The bicycle parking system of claim 8, the carrier frame further comprising an electronic control lock that locks the bicycle to the carrier frame in response to a lock command from an electronic device and unlocks the bicycle from the carrier frame in response to an unlock command from the electronic device.

10. The bicycle parking system of claim 8, the bicycle parking device further comprising a controller that bills the user for parking through an electronic device.

11. The bicycle parking system of claim 8, wherein the outer part of the second set of plates is provided with an arc gear ring which meshes with the first driving wheel, the first gear is driven by the first motor to drive the arc gear ring to drive the second set of plates to rotate.

12. The bicycle parking system of claim 11, wherein the rotating platform is provided with a second motor, a second driving wheel and a platform center wheel, the second motor is connected with the second driving wheel, and the second driving wheel engages with the platform center wheel.

13. The bicycle parking system of claim 12, wherein the carrier frame includes a bottom plate and a back plate, and the front wheel positioning groove and the rear wheel positioning groove are arranged on the bottom plate, and reinforcing plates are arranged on both sides of the connection between the bottom plate and the back plate.

14. The bicycle parking system of claim 13, wherein the rotating platform is provided with a plurality of locating pins, and the bottom plate of the carrier frame is provided with locating pin holes for inserting the locating pins.

* * * * *